(12) United States Patent
Tagaki

(10) Patent No.: US 9,749,485 B2
(45) Date of Patent: Aug. 29, 2017

(54) TOUCH PANEL APPARATUS AND IMAGE-FORMING APPARATUS PROVIDED WITH SAME

(71) Applicant: KYOCERA Document Solutions Inc., Osaka (JP)

(72) Inventor: Koji Tagaki, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 94 days.

(21) Appl. No.: 14/776,203

(22) PCT Filed: Sep. 3, 2014

(86) PCT No.: PCT/JP2014/073156
§ 371 (c)(1),
(2) Date: Sep. 14, 2015

(87) PCT Pub. No.: WO2015/045760
PCT Pub. Date: Apr. 2, 2015

(65) Prior Publication Data
US 2016/0021265 A1    Jan. 21, 2016

(30) Foreign Application Priority Data

Sep. 25, 2013  (JP) .................................. 2013-198810
Mar. 20, 2014  (JP) .................................. 2014-058648

(51) Int. Cl.
*G06F 3/041* (2006.01)
*H04N 1/00* (2006.01)
(Continued)

(52) U.S. Cl.
CPC ......... *H04N 1/00474* (2013.01); *G06F 3/041* (2013.01); *G06F 3/045* (2013.01);
(Continued)

(58) Field of Classification Search
CPC ........ G06F 3/0488; G06F 3/041; G06F 3/044; G06F 3/045; G06F 3/04842;
(Continued)

(56) References Cited

U.S. PATENT DOCUMENTS

| | | | |
|---|---|---|---|
| 8,488,169 B2 | 7/2013 | Morita | |
| 2009/0167717 A1* | 7/2009 | Wang | .................... G06F 3/0416 345/173 |

(Continued)

FOREIGN PATENT DOCUMENTS

| | | |
|---|---|---|
| JP | H10-39987 A | 2/1998 |
| JP | 2004-355078 A | 12/2004 |
| JP | 2011-100239 A | 5/2011 |

OTHER PUBLICATIONS

International Search Report dated Oct. 14, 2014 issued for PCT/JP2014/073156 application (pp. 1-2).

*Primary Examiner* — Vijay Shankar
(74) *Attorney, Agent, or Firm* — IP Business Solutions, LLC

(57) ABSTRACT

A mode of a touch panel (30) can be switched between a first operation mode for detecting coordinate positions of a contact point and a second operation mode for not detecting the coordinate positions of the contact point but detecting presence or absence of contact. An operation mode determining section (22) determines an operation mode of the touch panel (30) to be the first operation mode while a display control section (21) displays an image belonging to a first group, and the operation mode determining section (22) determines the operation mode of the touch panel (30) to be the second operation mode while the display control section displays an image belonging to a second group. An operation control section (23) operates the touch panel (30) in the operation mode determined by the operation mode determining section (22).

4 Claims, 9 Drawing Sheets

(51) Int. Cl.
 *G06F 3/0488* (2013.01)
 *G06F 3/045* (2006.01)
 *G06F 3/0482* (2013.01)
 *G06F 3/0484* (2013.01)

(52) U.S. Cl.
 CPC .......... *G06F 3/0416* (2013.01); *G06F 3/0482* (2013.01); *G06F 3/0488* (2013.01); *G06F 3/04842* (2013.01); *G06F 3/04886* (2013.01); *H04N 1/00411* (2013.01); *H04N 1/00413* (2013.01); *H04N 2201/0094* (2013.01)

(58) Field of Classification Search
 CPC .. G06F 3/0482; G06F 3/0416; G06F 3/04886; G06F 3/0484
 USPC .................................................. 345/173–183
 See application file for complete search history.

(56) References Cited

U.S. PATENT DOCUMENTS

| | | | |
|---|---|---|---|
| 2011/0102841 A1 | 5/2011 | Morita | |
| 2013/0016064 A1* | 1/2013 | Lee | G06F 3/0416 345/174 |
| 2013/0207905 A1* | 8/2013 | Hankins | G06F 3/041 345/173 |

\* cited by examiner

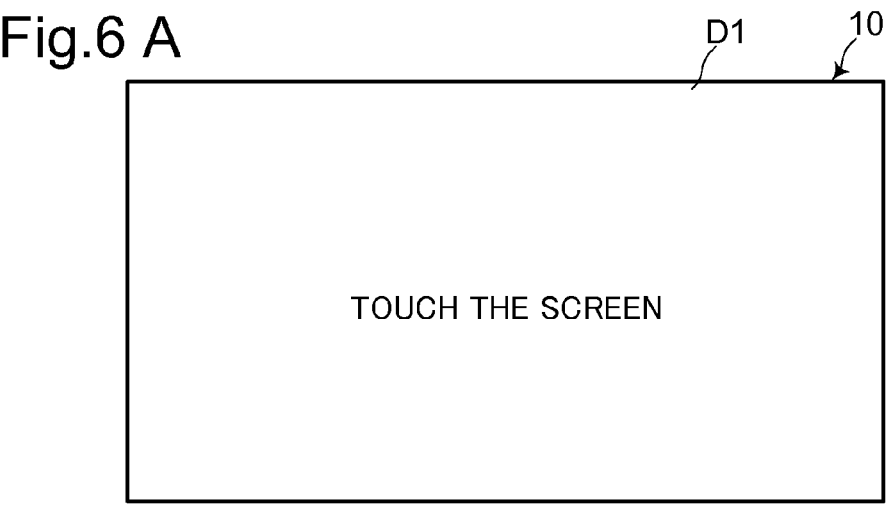
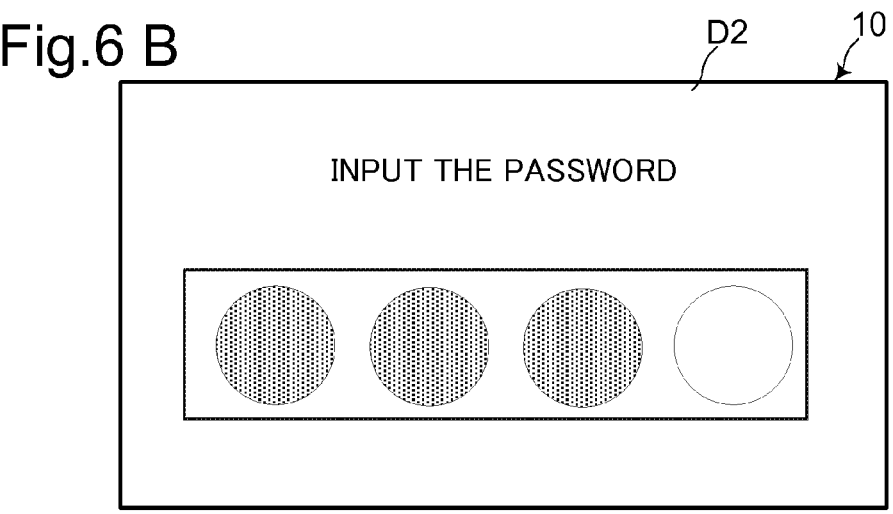
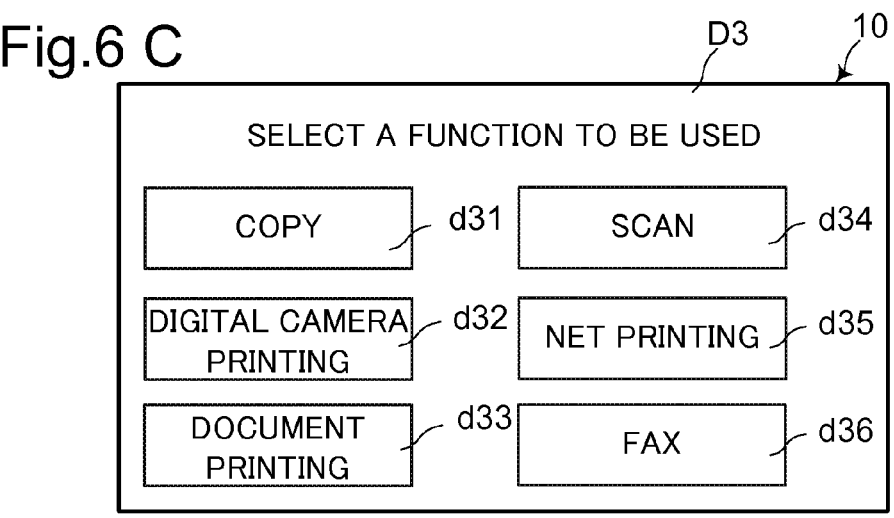

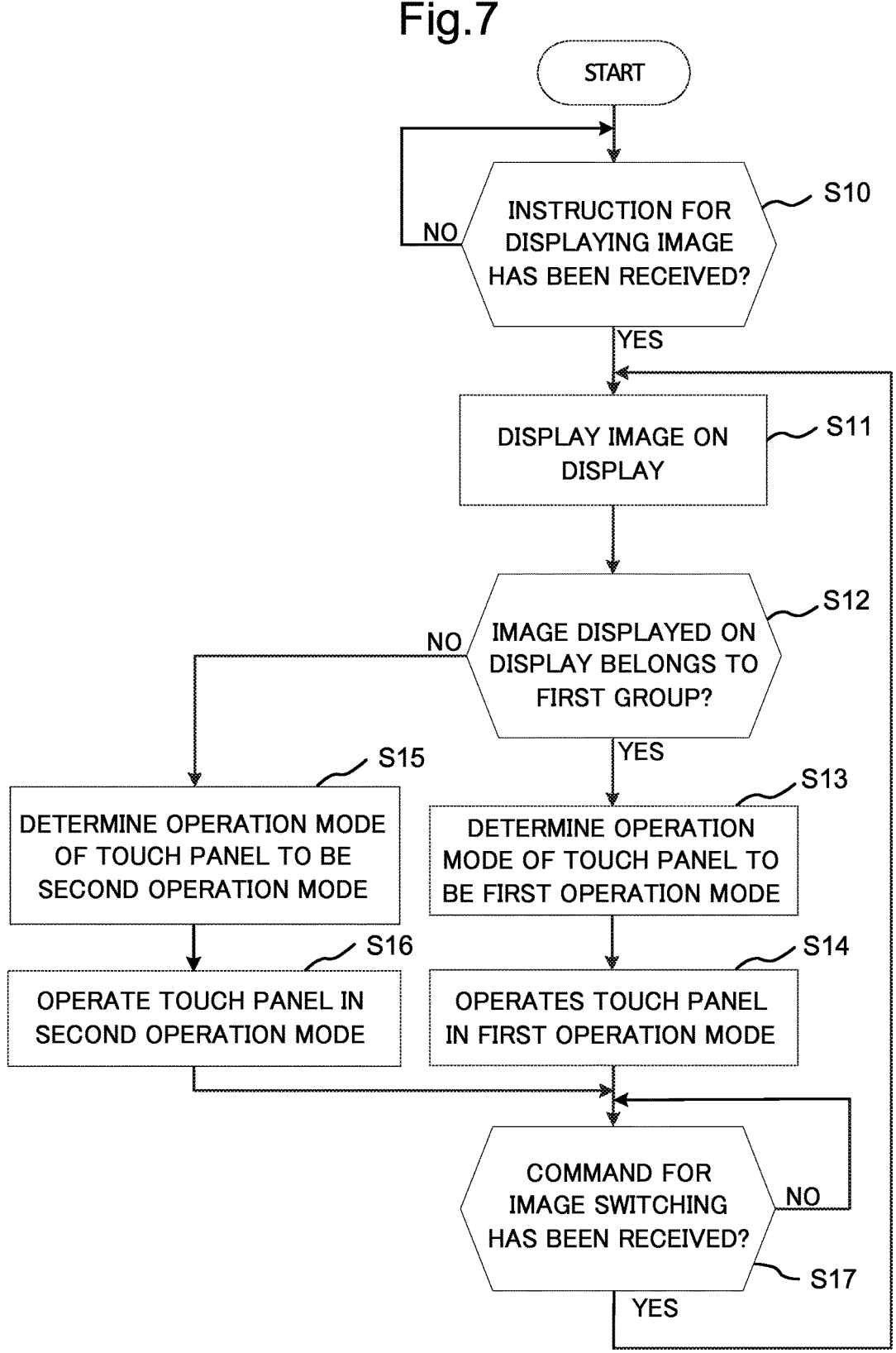

TOUCH PANEL APPARATUS AND IMAGE-FORMING APPARATUS PROVIDED WITH SAME

TECHNICAL FIELD

The present invention relates to a technology of reducing power consumption of a touch panel apparatus having a touch panel and an image-forming apparatus.

BACKGROUND ART

Known as a technology of reducing power consumption of a touch panel apparatus is a technology disclosed in Patent Literature 1. The touch panel apparatus disclosed in Patent Literature 1 has: a touch panel having a first resistance film and a second resistance film arranged oppositely to the first resistance film; and a control section controlling performance of the touch panel. The touch panel has a standby state and an operating state. In the standby state, the control section causes no flow of current for detecting coordinate positions of a contact point in the touch panel through the resistance films. If contact with the touch panel has been detected, the control unit switches an operation state of the touch panel to the operating state, and causes a flow of the current for detecting the coordinate positions of the contact point in the touch panel through the resistance films. As described above, the current for detecting the coordinate positions of the contact point is not caused to flow through the resistance films in the standby state, which can therefore reduce power consumption of the touch panel.

CONVENTIONAL LITERATURES

Patent Literatures

Patent Literature 1: Japanese Patent Application Laid-open No. H10-39987

SUMMARY OF THE INVENTION

Problem to be Solved by the Invention

In some cases, the touch panel apparatus not only receives a touch panel operation of acquiring the coordinate positions of the contact point but also receives an operation of simply acquiring presence or absence of contact or an operation of physical keys.

However, with the touch panel apparatus disclosed in Patent Literature 1 described above, once the touch panel is switched to the operation state, even in a case where the coordinate positions of the contact point does not have to be acquired, as in the aforementioned case where only the operation of the physical keys has been received, the current for detecting the coordinate positions of the contact point flows through the resistance films.

In view of the circumstance described above, the present invention has been made, and it is an object of the invention to provide a touch panel apparatus with more reduced power consumption, and an image-forming apparatus provided with same.

Means for Solving the Problem

A touch panel apparatus according to one aspect of the present invention includes: a display, a touch panel, a display control section, an operation mode determining section, and an operation control section. The touch panel is arranged on a front surface of the display and is capable of switching between a first operation mode for detecting coordinate positions of a contact point and a second operation mode for not detecting the coordinate positions of the contact point but detecting presence or absence of contact. The display control section displays, on the display, an image which belongs to a first group and which is displayed upon reception, from a user, of an operation requiring acquisition of the coordinate positions of the contact point and an image which belongs to a second group and which is displayed upon reception, from the user, of an operation not requiring the acquisition of the coordinate positions of the contact point but requiring detection of presence or absence of contact. The operation mode determining section determining an operation mode of the touch panel to be the first operation mode while the display control section displays the image belonging to the first group, and determines the operation mode of the touch panel to be the second operation mode while the display control section displays the image belonging to the second operation mode. The operation control section operates the touch panel in the operation mode determined by the operation mode determining section.

Moreover, a touch panel apparatus according to another aspect of the invention includes: a display, a touch panel, a display control section, an operation mode determining section, and an operation control section. The touch panel is arranged on a front surface of the display and being capable of switching between a first operation mode for detecting coordinate positions of a contact point and a third operation mode for not detecting the coordinate positions of the contact point and presence or absence of contact. The display control section displays, on the display, an image which belongs to a fourth group and which is displayed upon reception, from a user, of a touch operation requiring either of the detection of the coordinate positions of the contact point and the detection of presence or absence of contact. The operation mode determining section determine an operation mode of the touch panel to be the first operation mode while the display control section displays the image belonging to the fourth group, and determines the operation mode of the touch panel to be the third operation mode while the display control section displays the image not belonging to the fourth group but belonging to a fifth group. The operation control section operates the touch panel in the operation mode determined by the operation mode determining section.

Moreover, an image-forming apparatus according to still another aspect of the invention includes: the touch panel apparatus described above, a control section, and an image formation section. The control section receives an instruction related to image formation based on whether or not there is a contact point detected by the touch panel apparatus and/or coordinate positions of the contact point. The image formation section forming an image on recording paper based on the instruction received by the control section,

Effects of the Invention

The present invention can provide a touch panel apparatus with more reduced power consumption and an image-forming apparatus provided with same.

BRIEF DESCRIPTION OF THE DRAWINGS

FIG. 6A is a view showing one example of a screen displayed on a display 50 of the touch panel apparatus.

FIG. 6B is a view showing one example of a screen displayed on a display 50 of the touch panel apparatus.

FIG. 6C is a view showing one example of a screen displayed on a display 50 of the touch panel apparatus.

FIG. 7 is a flowchart showing a flow of operation mode switching processing in the touch panel apparatus according to one embodiment of the invention.

MODES FOR CARRYING OUT THE INVENTION

Figure 1:
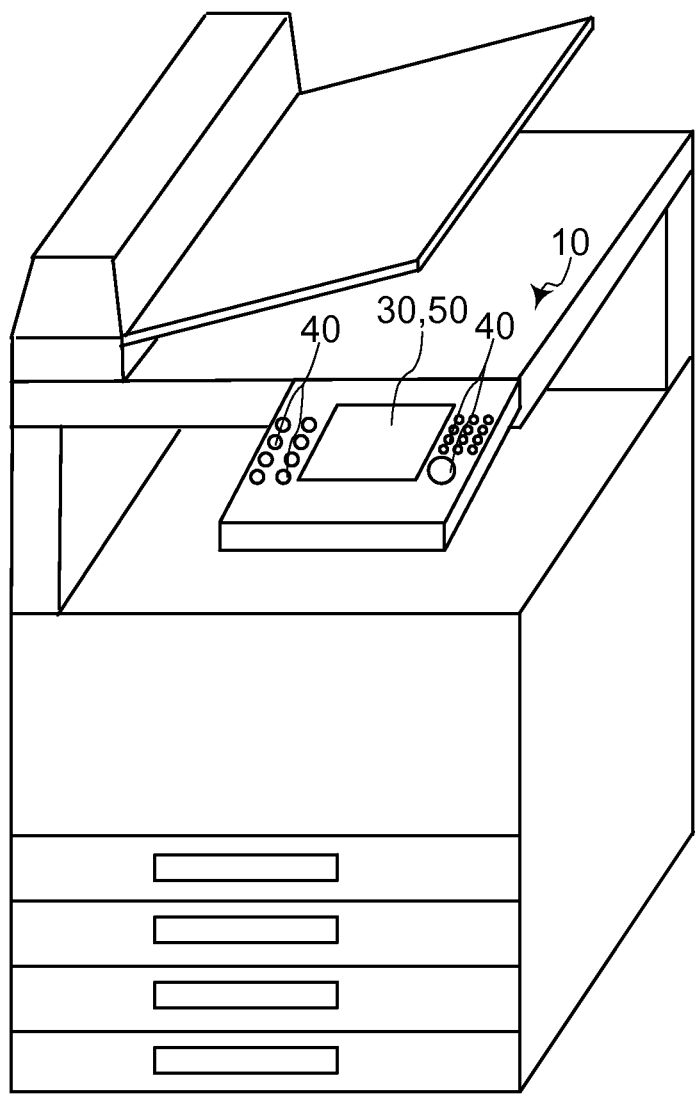
FIG. 1 is a perspective view showing external appearance of an image-forming apparatus according to one embodiment of the present invention.

Hereinafter, a touch panel apparatus and an image-forming apparatus according to one embodiment of the present invention will be described with reference to the drawings. FIG. 1 is a perspective view showing external appearance of the image-forming apparatus according to one embodiment of the invention.

The image-forming apparatus 1 according to one embodiment of the invention is a multifunction peripheral combining together a plurality of functions including, for example, a copy function, a printer function, a scanner function, and a facsimile function. As shown in FIG. 1, the image forming apparatus 1 includes a touch panel apparatus 10. The touch panel apparatus 10 has: a display 50; a touch panel 30 arranged on a front surface of this display 50; physical keys 40; etc., and for various operations and processing executable by the image-forming apparatus 1, receives instructions such as an image formation operation execution instruction and an original copy reading operation execution instruction from a user.

Figure 2:
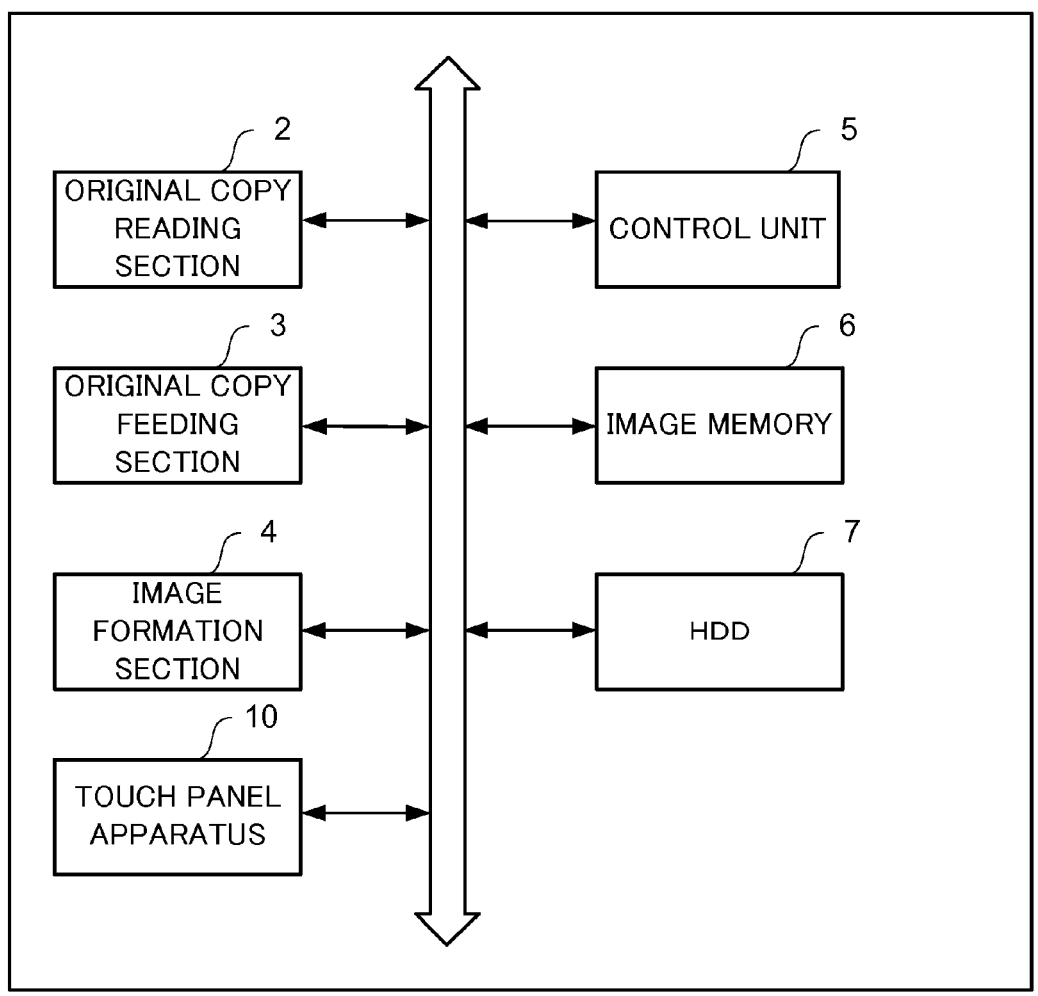
FIG. 2 is a functional block diagram schematically showing main inner configuration of the image-forming apparatus according to one embodiment of the invention.

FIG. 2 is a functional block diagram schematically showing main inner configuration of the image forming apparatus 1. As shown in FIG. 2, the image-forming apparatus 1 includes: an original copy reading section 2, an original copy feeding section 3, an image formation section 4, a control unit 5, an image memory 6, an HDD (hard disc drive) 7, the touch panel apparatus 10, etc.

The control unit 5 is composed of: a CPU (Central Processing Unit), a RAM, a ROM, a desiccated hardware circuit, etc., and is responsible for overall operation control of the image forming apparatus 1. The control unit 5 is connected to the original copy reading section 2, the original copy feeding section 3, the image formation section 4, the control unit 5, the image memory 6, the HDD 7, the touch panel apparatus 10, etc., and performs driving control of these sections. In particular, the control unit 5 receives instructions related to image formation, etc. based on whether or not there is a contact point and/or coordinate positions of the contact points by which the touch panel apparatus 10 detects based on a user operation. Then the control unit 5 performs the driving control of the various sections described above based on its settings.

The original copy reading section 2 includes a light irradiation section, a CCD sensor, etc., and under the control by the control unit 5, irradiates an original copy by the light irradiation section and receives its reflection light by the CCD sensor to thereby read image data from the original copy.

The original copy feeding section 3 sends the original copy on an original copy loading section (not shown) to a position readable by the original copy reading section 2.

The image formation section 4 forms an image on recording paper based on the instructions related to image formation received by the control unit 5.

The image memory 6 is a region which temporarily stores the image data of the original copy acquired thorough the reading by the original copy reading section 2 and also which temporarily saves data targeted for printing at the image formation section 4.

The HDD 7 is a large-capacity storage device that stores, for example, the image data of the original copy acquired through the reading by the original copy reading section 2.

Figure 3:
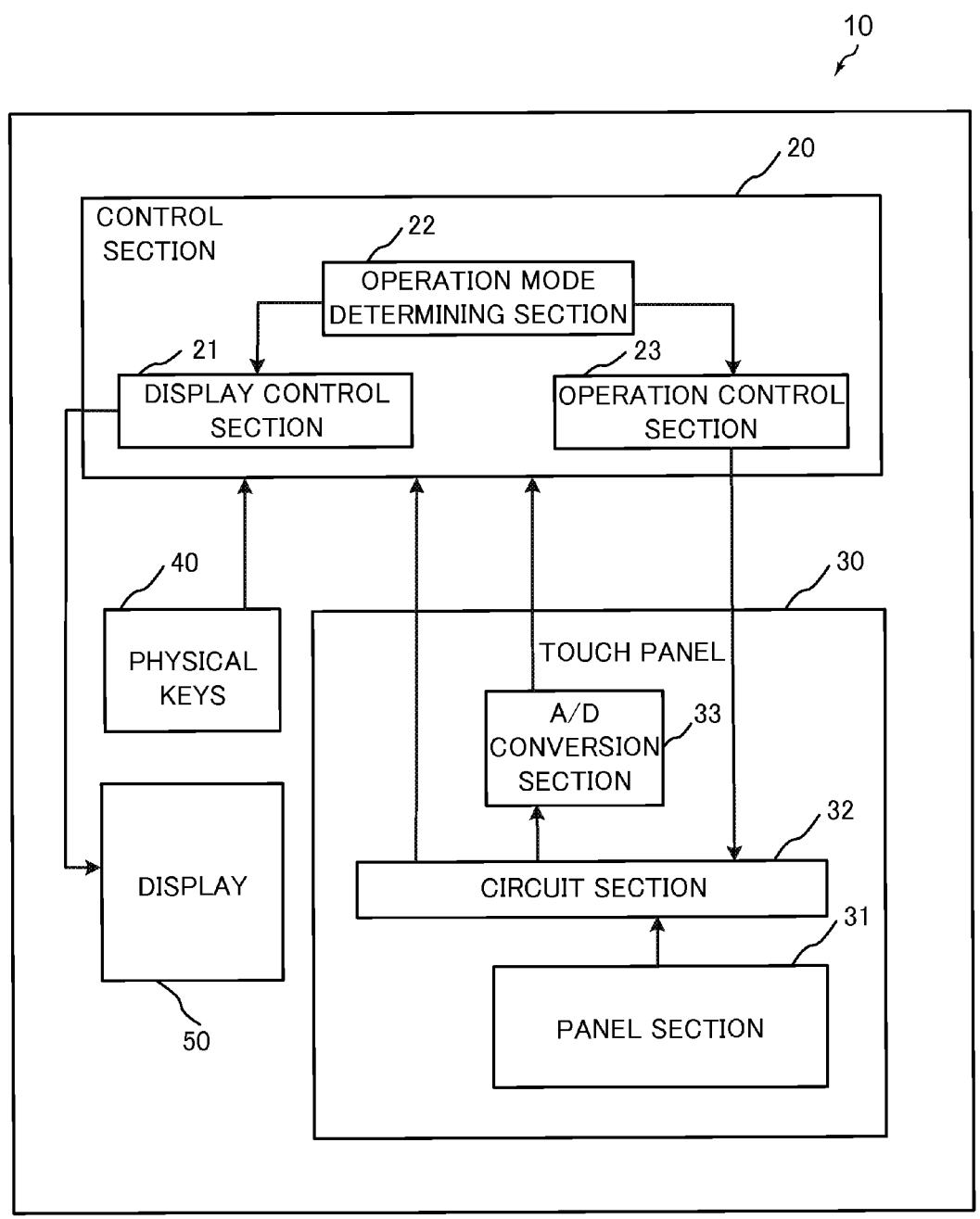
FIG. 3 is a functional block diagram schematically showing main inner configuration of a touch panel apparatus according to one embodiment of the invention.

Next, configuration of the touch panel apparatus 10 will be described. FIG. 3 is a functional block diagram schematically showing main inner configuration of the touch panel apparatus 10. As shown in FIG. 3, the touch panel apparatus 10 includes: a control section 20, the touch panel 30, the physical keys 40; the display 50, etc.

The control section 20 is composed of: the CPU, the RAM, the ROM, the dedicated hardware circuit, etc. The control section 20 is connected to the touch panel 30, the physical keys 40, the display 50, etc., and performs the driving control of these sections.

The control section 20 includes: a display control section 21, an operation mode determining section 22, and an operation mode control section 23. The display control section 21 has a function of displaying, on the display 50, an image stored in a storage device or the like of the touch panel apparatus 10. The operation mode determining section 22 has a function of determining an operation mode of the touch panel 30, to be described later on, based on the image displayed on the display 50 by the display control section 21. The operation mode control section 23 has a function of operating the touch panel 30 in the operation mode determined by the operation mode determining section 22.

Detailed configuration of each of the display control section 21, the operation mode determining section 22, and the operation mode control section 23 described above will be described later on.

The physical keys 40 include: for example, a menu key for retrieving a menu; arrow keys for moving a focus of a GUI forming the menu; a determine key for performing a confirmation operation on the GUI forming the menu; numerical keys; etc., and receives, from the user, an operation made for the menu displayed on the display 50.

The display 50 is composed of a liquid crystal display (LCD) or an organic light-emitting diode (OLED) display. The display 50 displays a setting menu related to the image formation, etc., based on the control by the display control section 21 of the control section 20.

The touch panel 30 is arranged on a front surface of the display 50, and detects coordinate positions of a point of contact with the touch panel 30 and presence or absence of contact. The touch panel 30 includes: a panel section 31, a circuit section 32, an A/D conversion section 33, etc.

Figure 4:
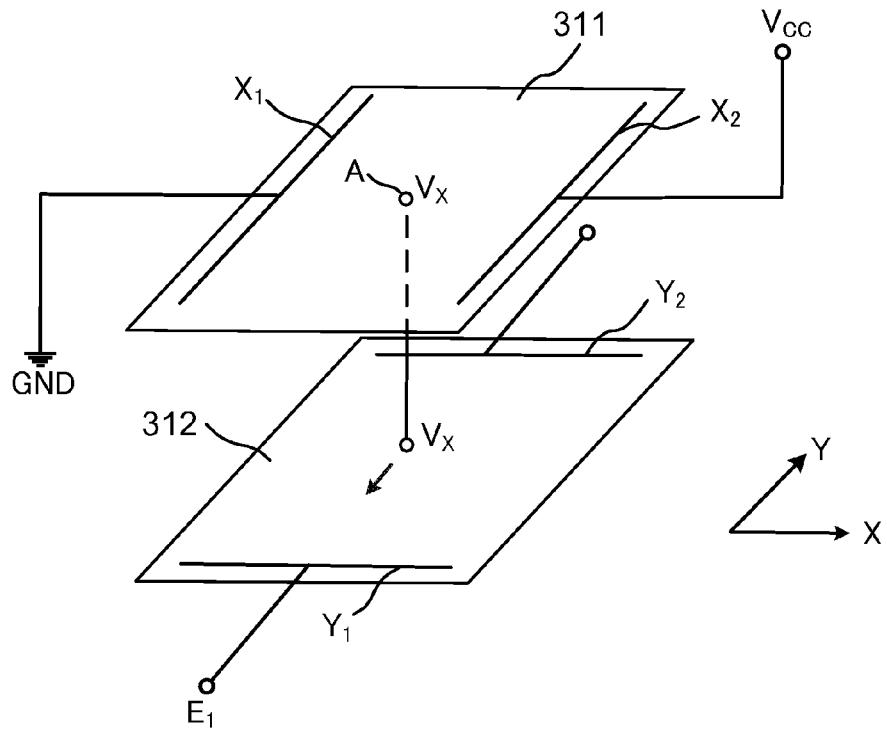
FIG. 4A is a view showing configuration of a panel part in an operation mode for detecting an X coordinate position of a contact point.
FIG. 4B is a view showing configuration of the panel part in an operation mode for detecting a Y coordinate position of the contact point.
Figure 4:
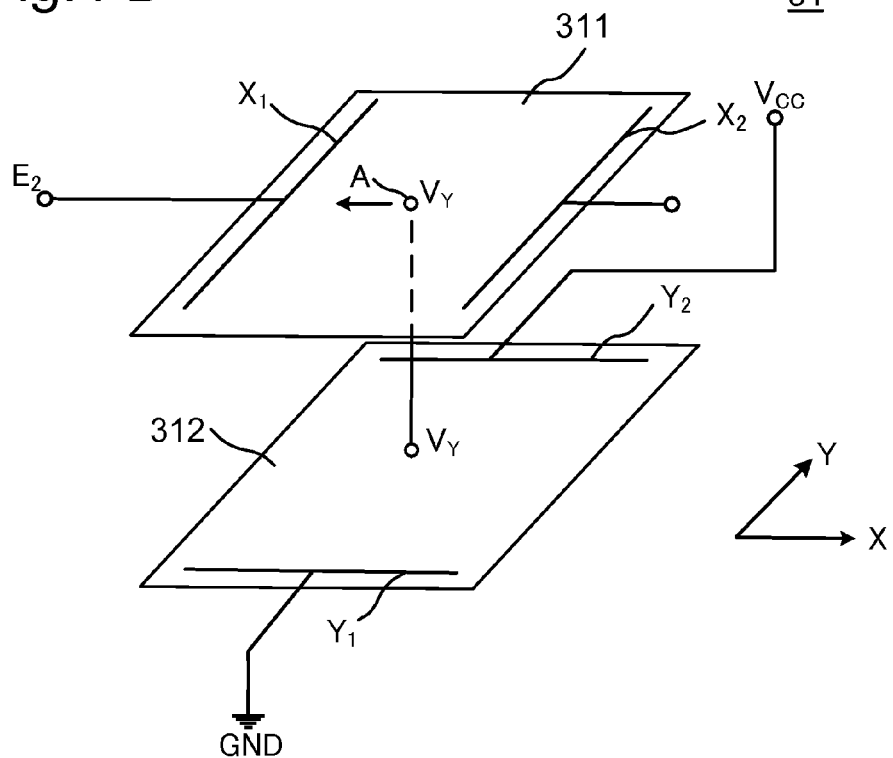

As shown in FIGS. 4A and 4B, the panel section 31 has: a first resistance film 311 and a second resistance film 312 formed of, for example, transparent and conductive metal. The first resistance film 311 is arranged oppositely to the second resistance film 312 with a spacer, not shown, in between. Formed at both end parts of the first resistance film 311 are electrodes $X_1$ and $X_2$. Moreover, formed at both end parts of the second resistance film 312 are electrodes $Y_1$ and $Y_2$. Each of the electrodes described above is connected to the circuit section 32. The operation mode control section 23 controls, for example, a transistor of the circuit section 32, thereby applying, to each of the electrodes described above, voltage in accordance with the operation mode determined by the operation mode determining section 22.

The touch panel 30 has: a first operation mode for detecting the coordinate positions of the point of the contact with the touch panel 30; and a second operation mode for not detecting the coordinate positions of the point of the contact with the touch panel 30 but detecting whether or not there is such contact. Moreover, the first operation mode has: an operation mode for detecting the X coordinate position of the contact point; and an operation mode for detecting the Y coordinate position of the contact point.

First, an operation mechanism of detecting the X coordinate position of the contact point will be described. FIG. 4A shows configuration of the panel section 31 in the operation mode for detecting the X coordinate position of the contact point. As shown in FIG. 4A, in the operation mode for detecting the X coordinate position of the contact point, the operation mode control section 23 controls the circuit section 32 to set a potential of the electrode $X_2$ of the first resistance film 311 at $V_{cc}$ and set a potential of the electrode $X_1$ thereof at a GND level. As a result, at the first resistance film 311, potential gradient occurs. Contact of, for example, user's finger with the touch panel 30 results in contact between the first resistance film 311 and the second resistance film 312. At this point, a potential $E_1$ of the electrode $Y_1$ of the second resistance film 312 turns into a potential $V_x$ in accordance with the X coordinate position of the contact point A. The A/D conversion section 33 subjects this potential $V_x$ to analog-digital conversion and outputs it. The operation mode control section 23 detects the X coordinate of the contact point A based on a signal outputted from the A/D conversion section 33.

Next, an operation mechanism of detecting the Y coordinate position of the contact point will be described. FIG. 4B shows configuration of the panel section 31 in the operation mode for detecting the Y coordinate position of the contact point. As shown in FIG. 4B, in the operation mode for detecting the Y coordinate position of the contact point, the operation mode control section 23 controls the circuit section 32 to set a potential of the electrode $Y_2$ of the second resistance film 312 at $V_{CC}$ and a potential of the electrode $Y_1$ thereof at a GND level. As a result, potential gradient occurs at the second resistance film 312. Contact of, for example, the user's finger results in contact between the first resistance film 311 and the second resistance film 312. At this point, the potential $E_2$ of the electrode $X_1$ of the first resistance film 311 turns into a potential $V_Y$ in accordance with the Y coordinates position of the contact point A. The A/D conversion section 33 subjects this potential $V_Y$ to analog-digital conversion and outputs it. The operation mode control section 23 detects the Y coordinate of the contact point A based on a signal outputted from the A/D conversion section 33.

In the first operation mode, the operation mode control section 23 controls the circuit section 32 to repeat the operation mode for detecting the X coordinate position of the contact point described above and the operation mode for detecting the Y coordinate position thereof, thereby detecting the X coordinates and the Y coordinates of the contact point. As described above, if the operation mode determined by the operation mode determining section 22 is the first operation mode, the operation mode control section 23 causes formation of a predefined potential difference between the electrode formed at one end part of the first resistance film 311 or the second resistance film 322 and the electrode formed at another end part thereof.

Figure 5:
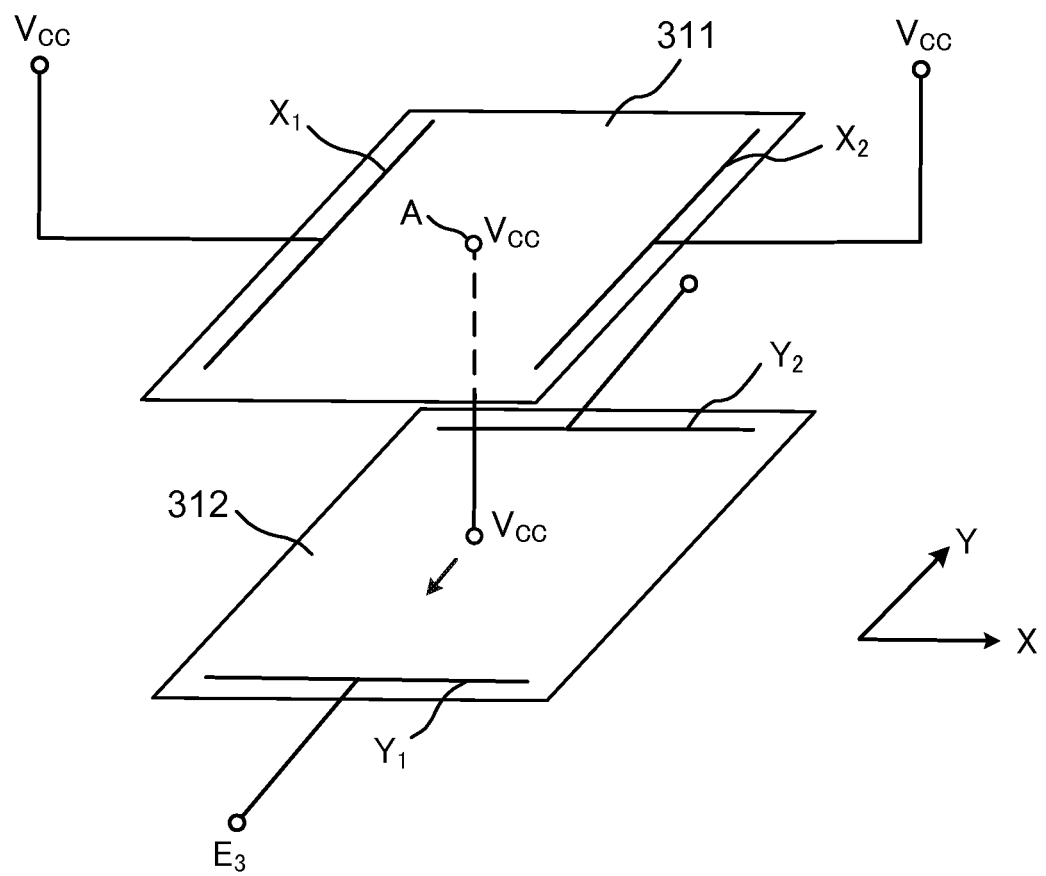
FIG. 5 is a view showing configuration of the panel part in a second operation mode.

Next, the second operation mode will be described. FIG. 5 is a view showing configuration of the panel section 31 in the second operation mode. As shown in FIG. 5, in the second operation mode, the operation mode control section 23 controls the circuit section 32 to set the potentials of the electrodes $X_1$ and $X_2$ of the first resistance film 311 at the same potential, i.e., $V_{cc}$. Contact of, for example, the user's finger with the touch panel 30 results in contact between the first resistance film 311 and the second resistance film 312. At this point, a potential $E_3$ of the electrode $Y_1$ of the second resistance film 312 turns into the potential $V_{cc}$. The operation mode control section 23 detects a change in this potential $E_3$ to thereby detect presence or absence of contact with the touch panel 30. To the first resistance film 311, little current flows, and as in the first operation mode, there is no need of switching between the operation mode for detecting the X coordinate position of the contact point and the operation mode for detecting the Y coordinate position thereof, and thus power consumption of the touch panel 30 in the second mode is less than that in the first operation mode. As described above, if the operation mode determined by the operation mode determining section 22 is the second operation mode, the operation mode control section 23 provides the same potential for the electrode formed at one end part of the first resistance film 311 or the second resistance film 312 and the electrode formed at another end part thereof.

Next, processing of determining the operation mode of the touch panel 30 will be described.

The operation mode determining section 22, based on the image displayed on the display 50 by the display control section 21, determines the operation mode of the touch panel 30. Stored in the storage device or the like in the touch panel apparatus 10 are images previously belonging to a first group and images belonging to a second group, and while the display control section 21 displays on the display 50 any of the images belonging to the first group, the operation mode determining section 22 determines the operation mode of the touch panel 30 to be the first operation mode. Moreover, while the display control section 21 displays on the display 50 any of the images belonging to the second group, the operation mode determining section 22 determines the operation mode of the touch panel 30 to be the second operation mode. Here, the image belonging to the first group is an image displayed on the display 50 upon reception, from the user, of an operation that requires acquisition of the coordinate position of the contact point. Moreover, the image belonging to the second group is an image displayed on the display 50 upon reception, from the user, of an operation that does not require the acquisition of the coordinate position of the contact point but requires detection of presence or absence of contact.

FIGS. 6A, 6B, and 6C are views each showing one example of a screen displayed on the display 50 of the touch panel apparatus 10.

A displayed image D1 shown in FIG. 6A is stored as the image belonging to the second group in the storage device or the like in the touch panel apparatus 10. This displayed image D1 is displayed upon the reception of the contact with the touch panel 30. While this displayed image D1 is displayed, the control section 20 does not have to acquire the coordinate position of the contact point, and thus the operation mode determining section 22 determines the operation mode of the touch panel 30 to be the second operation mode. Then the operation mode control section 23 controls the circuit section 32 to operate the touch panel 30 in the second operation mode.

A displayed image D2 shown in FIG. 6B is stored as the image belonging to the second group in the storage device or the like in the touch panel apparatus 10. This displayed image D2 is displayed upon reception of input from the physical keys 40. While this displayed image D2 is displayed, the control section 20 does not have to acquire the coordinate position of the contact point, and thus the operation mode determining section 22 determines the operation mode of the touch panel 30 to be the second operation mode. Then the operation mode control section 23 controls the circuit section 32 to operate the touch panel 30 in the second operation mode.

A displayed image D3 shown in FIG. 6C is stored as the image belonging to the first group in the storage device or the like in the touch panel apparatus 10. This displayed image D3 is displayed upon reception, from the user, of an operation of selection from buttons d31 to d36. While this displayed image D3 is displayed, the control section 20 has to acquire the coordinate position of the contact point, and thus the operation mode determining section 22 determines the operation mode of the touch panel 30 to be the first operation mode. Then the operation mode control section 23 controls the circuit section 32 to operate the touch panel 30 in the first operation mode.

Next, operation of the touch panel apparatus 10 having the configuration described above will be described. FIG. 7 is a flowchart showing a flow of operation mode switching processing in the touch panel apparatus 10.

As shown in FIG. 7, the display control section 21 of the touch panel apparatus 10 judges whether or not an instruction for displaying an image on the display 50 has been received (step S10).

If the instruction for displaying the image has been received (YES in step S10), the display control section 21 displays, on the display 50, the image stored in the storage device or the like in the touch panel apparatus 10 (step S11).

The operation mode determining section 22 judges whether or not the image displayed on the display 50 by the display control section 21 is the image belonging to the first group (step S12).

If the image displayed by the display control section 21 is the image belonging to the first group (YES in step S12), the operation mode determining section 22 determines the operation mode of the touch panel 30 to the be the first operation mode (step S13).

Then the operation mode control section 23 controls the circuit section 32 to puts the operation mode of the touch panel 30 into the first operation mode (step S14).

If the image displayed by the display control section 21 is not the image belonging to the first group (NO in step S12), the operation mode determining section 22 determines the operation mode of the touch panel 30 to be the second operation mode (step S15).

Then the operation mode control section 23 controls the circuit section 32 to put the operation mode of the touch panel 30 into the second operation mode (step S16).

After the processing in steps S14 and S16, the display control section 21 judges whether or not a command for switching the image displayed on the display 50 has been received from a touch panel control program (step S17).

If the command for switching the image has been received (YES in step S17), the processing returns to step S11, the image is displayed on the display 50, and then the operation mode of the touch panel 30 is switched.

As described above, in the touch panel apparatus 10 according to this embodiment, the touch panel 30 can switch between the first operation mode for detecting the coordinate positions of the contact point and the second operation mode for not detecting the coordinate positions of the contact point but detecting presence or absence of contact. Then while the display control section 21 displays the image which belongs to the first group and which is displayed upon the reception, from the user, of the operation requiring the acquisition of the coordinate positions of the contact point, the operation mode determining section 22 determines the operation mode of the touch panel 30 to be the first operation mode, and while the display control section 21 displays the image which belongs to the second group and which is displayed upon the reception, from the user, of an operation not requiring the acquisition of the coordinate positions of the contact point but requiring the detection of presence or absence of contact, the operation mode determining section 22 determines the operation mode of the touch panel 30 to be the second operation mode. Then the operation mode control section 23 operates the touch panel 30 in the operation mode determined at the operation mode determining section 22. If the image which belongs to the second group and which does not require the acquisition of the coordinate position of the contact point, the operation mode of the touch panel is put into the second operation mode that does not cause current flow for detecting the coordinate positions of the contact point, and thus power consumption of the touch panel apparatus 10 can be more reduced.

Note that the present invention is not limited to the configuration of the embodiment described above, and various modifications thereto can be made.

Figure 8:
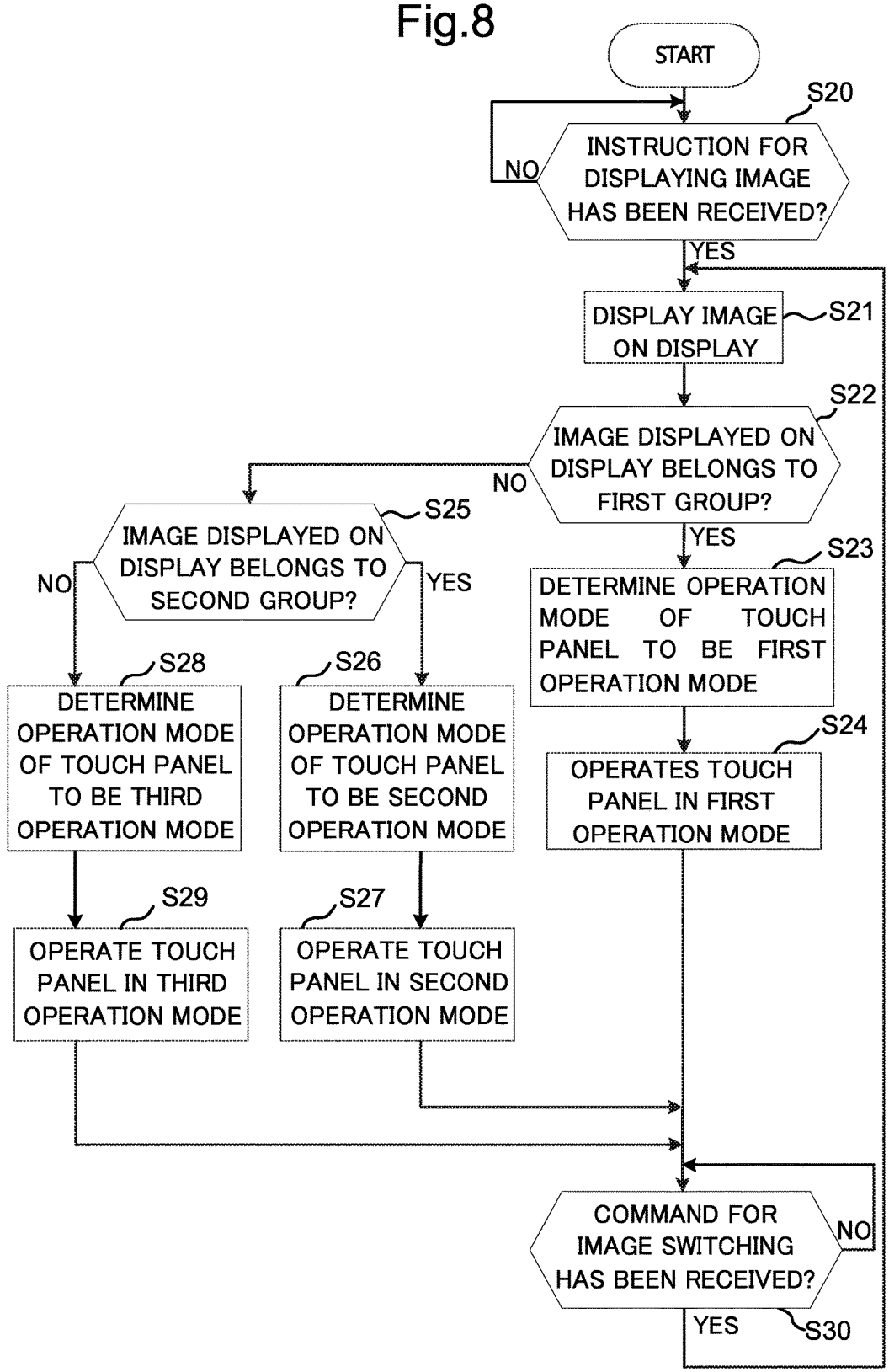
FIG. 8 is a flowchart showing a flow of operation mode switching processing in a touch panel apparatus according to Modified Example 1.

FIG. 8 is a flowchart showing a flow of operation mode switching processing according to Modified Example 1. The same contents of the processing as that of the flowchart of FIG. 7 will be omitted from the description.

In Modified Example 1, if the image displayed by the display control section 21 is not the image belonging to the first group (NO in step S22), the operation mode determining section 22 further judges whether or not the image displayed by the display control section 21 is the image belonging to the second group (step S25).

If the image displayed by the display control section 21 is the image belonging to the second group (YES in step S25), the operation mode determining section 22 determines the operation mode of the touch panel 30 to be the second operation mode (step S26).

Then the operation mode control section 23 controls the circuit section 32 to put the operation mode of the touch panel 30 into the second operation mode (step S27).

If the image displayed by the display control section 21 is not the image belonging to the second group (NO in step S25), the operation mode determining section 22 puts the operation mode of the touch panel 30 into a third operation mode (step S28). Here, the third operation mode is an operation mode for detecting neither the coordinate positions of the contact point nor presence or absence of contact. No current for detecting presence or absence of contact flows through the touch panel 30, and thus power consumption of the touch panel 30 in the third operation mode is less than that in the first and second operation modes.

For example, in Modified Example 1, the displayed image D2 shown in FIG. 6B is stored as an image belonging to the third group in the storage device or the like in the touch panel apparatus 10. This displayed image D2 is displayed upon reception of input from the physical keys 40. While this displayed image D2 is displayed, the control section 20 does not have to acquire the coordinate positions of the contact point and presence or absence of contact, and thus the operation mode determining section 22 determines the operation mode of the touch panel 30 to be the third operation mode.

Then the operation mode control section 23 controls the circuit section 32 to put the operation mode of the touch panel 30 into the third operation mode (step S29).

Figure 9:
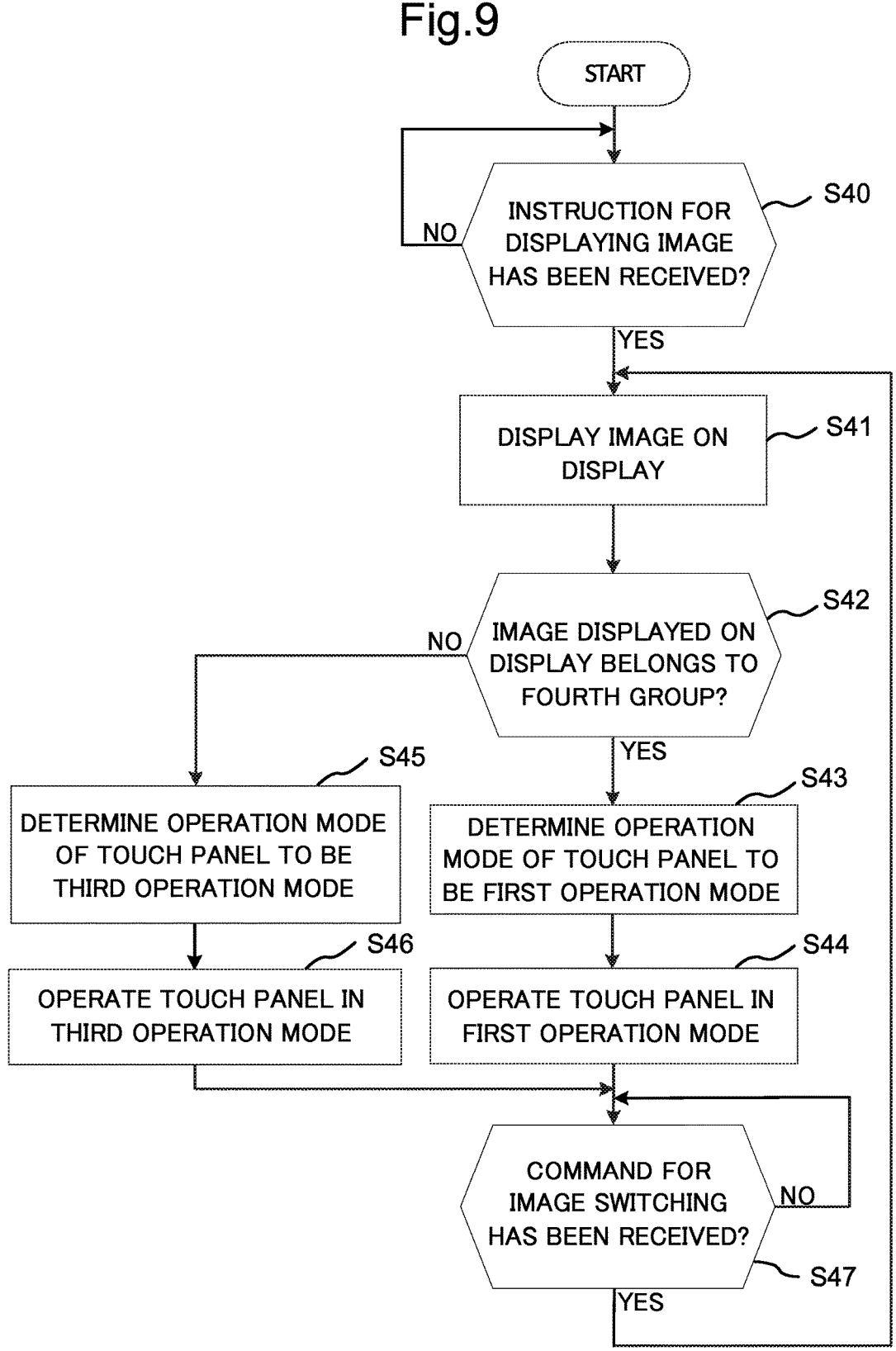
FIG. 9 is a flowchart showing a flow of operation mode switching processing in a touch panel apparatus according to Modified Example 2.

FIG. 9 is a flowchart showing a flow of operation mode switching processing according to Modified Example 2. The same contents of the processing as that of the flowchart of FIG. 7 will be omitted from the description.

In Modified Example 2, the operation mode determining section 22 determines whether or not the image displayed on the display 50 by the display control section 21 is an image belonging to a fourth group (step S42).

Here, the image belonging to the fourth group is an image displayed on the display 50 upon reception, from the user, of a touch operation (operation requiring detection of the coordinate positions of the contact point or detection of presence or absence of contact). For example, the displayed image D1 shown in FIG. 6A and the displayed image D3 shown in FIG. 6C are stored as the images belonging to the fourth group in the storage device or the like in the touch panel apparatus 10.

If the image displayed by the display control section 21 is the image belonging to the fourth group (YES in step S42), the operation mode determining section 22 puts the operation mode of the touch panel 30 into the first operation mode (step S43).

After the processing of step S43, the operation mode control section 23 controls the circuit section 32 to put the operation mode of the touch panel 30 into the first operation mode (step S44).

On the other hand, if the image displayed by the display control section 21 is not the image belonging to the fourth group (NO in step S42), the operation mode determining section 22 determines the operation mode of the touch panel 30 to be the third operation mode (step S45).

For example, in Modified Example 2, the displayed image D2 shown in FIG. 6B is stored as an image belonging to a fifth group in the storage device or the like in the touch panel apparatus 10. Here, the image belonging to the fifth group is an image displayed on the display 50 if the touch operation does not have to be received from the user.

After the processing of step S45, the operation mode control section 23 controls the circuit section 32 to put the operation mode of the touch panel 30 into the third operation mode (step S46).

As described above, in the touch panel apparatus 10 according to Modified Example 2, the touch panel 30 can switch between the first operation mode for detecting the coordinate positions of the contact point and the third operation mode for not detecting the coordinate positions of the contact point and presence or absence of contact. Then while the display control section 21 displays the image which belongs to the fourth group and which is displayed upon reception, from the user, of the touch operation requiring the detection of the coordinate positions of the contact point and presence or absence of contact, the operation mode determining section 22 determines the operation mode of the touch panel 30 to be the first operation mode, and while the display control section 21 displays the image not belonging to the fourth group but belonging to the fifth group, the operation mode determining section 22 determines the operation mode of the touch panel 30 to be the third operation mode. In the touch panel apparatus 10 according to Modified Example 2, if the touch operation does not have to be received from the user, no current for detecting the coordinate positions of the contact point and presence or absence of contact flows through the touch panel 30, and thus the power consumption of the touch panel apparatus 10 can be reduced.

Moreover, the aforementioned technique may be implemented by storing into a memory a program including a description of procedures of processing performed by the control section 20 shown in FIGS. 7, 8, and 9 described above, reading out the program from the memory such as a CPU, and executing the read program. Further, the program including the description of the procedures of this technique may be stored into a recording medium and distributed.

The invention claimed is:

1. An image-forming apparatus comprising:
   a touch panel apparatus;
   a control section receiving an instruction related to image formation based on whether or not there is a contact point detected by the touch panel apparatus and/or coordinate positions of the contact point; and
   an image formation section forming an image on recording paper based on the instruction received by the control section,
   wherein the touch panel apparatus comprises:
   a display;
   a physical key receiving, from a user, an operation made for a menu displayed on the display;
   a touch panel arranged on a front surface of the display and being capable of switching among a first operation mode for detecting the coordinate positions of the contact point and a second operation mode for not detecting the coordinate positions of the contact point but detecting presence or absence of contact, and a third operation mode for not detecting the coordinate positions of the contact point and presence or absence of contact but receiving input from the physical key;
   a display control section displaying, on the display, an image which belongs to a first group and which is displayed upon reception, from the user, of an operation requiring acquisition of the coordinate positions of the contact point and an image which belongs to a second group and which is displayed upon reception, from the user, of an operation not requiring the acquisition of the coordinate positions of the contact point but requiring the detection of presence or absence of contact;
   an operation mode determining section determining an operation mode of the touch panel to be the first operation mode while the display control section displays the image belonging to the first group, determining the operation mode of the touch panel to be the second operation mode while the display control section displays the image belonging to the second operation mode, and determining the operation mode of the touch panel to be the third operation mode while the display control section displays an image belonging to a third group, the image belonging to the third group being not belonging to either of the first group and the second group; and an operation control section operating the touch panel in the operation mode determined by the operating mode determining section.

2. A touch panel apparatus comprising:

a display;

a physical key receiving, from a user, an operation made for a menu displayed on the display;

a touch panel arranged on a front surface of the display and being capable of switching among a first operation mode for detecting coordinate positions of a contact point, a second operation mode for not detecting the coordinate positions of the contact point but detecting presence or absence of contact, and a third operation mode for not detecting the coordinate positions of the contact point and presence or absence of contact but receiving input from the physical key;

a display control section displaying, on the display, an image which belongs to a first group and which is displayed upon reception, from the user, of an operation requiring acquisition of the coordinate positions of the contact point and an image which belongs to a second group and which is displayed upon reception, from the user, of an operation not requiring the acquisition of the coordinate positions of the contact point but requiring detection of presence or absence of contact;

an operation mode determining section determining an operation mode of the touch panel to be the first operation mode while the display control section displays the image belonging to the first group, determining the operation mode of the touch panel to be the second operation mode while the display control section displays the image belonging to the second operation mode, and determining the operation mode of the touch panel to be the third operation mode while the display control section displays an image belonging to a third group, the image belonging to the third group being not belonging to either of the first group and the second group; and an operation control section operating the touch panel in the operation mode determined by the operation mode determining section.

3. The touch panel apparatus according to claim 2, wherein the touch panel has a first resistance film and a second resistance film arranged oppositely to each other and electrodes formed at both end parts of the first resistance film and the second resistance film, and if the operation mode determined by the operation mode determining section is the first operation mode, the operation control section forms a predefined potential difference between the electrode formed at one end part of either of the first resistance film and the second resistance film and the electrode formed at another end part thereof, and if the operation mode determined by the operation mode determining section is the second operation mode, the operation control section provides the same potential for the electrode formed at one end part of either of the first resistance film and the second resistance film and the electrode formed at another end part thereof.

4. The touch panel apparatus according to claim 2, wherein the image belonging to the third group is a screen for inputting a password.

\* \* \* \* \*